(12) United States Patent
Walawender et al.

(10) Patent No.: US 10,883,299 B2
(45) Date of Patent: Jan. 5, 2021

(54) BONDING BRACKET FOR AN OPERABLE VEHICLE WINDOW HAVING A PARTIALLY OPEN ADHESIVE CHANNEL

(71) Applicant: Ford Global Technologies, LLC, Dearborn, MI (US)

(72) Inventors: Chester Stanislaus Walawender, Livonia, MI (US); Muhammed Ayub, Canton, MI (US); Gabriel Blanco, West Bloomfield, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/658,443

(22) Filed: Oct. 21, 2019

(65) Prior Publication Data
US 2020/0048949 A1 Feb. 13, 2020

Related U.S. Application Data

(62) Division of application No. 15/459,026, filed on Mar. 15, 2017, now Pat. No. 10,487,558.

(51) Int. Cl.
*E05F 11/38* (2006.01)
*B60J 1/17* (2006.01)
*B60J 1/00* (2006.01)
*E05F 15/689* (2015.01)

(52) U.S. Cl.
CPC ............. *E05F 11/385* (2013.01); *B60J 1/006* (2013.01); *B60J 1/17* (2013.01); *E05F 15/689* (2015.01); *E05Y 2900/55* (2013.01)

(58) Field of Classification Search
None
See application file for complete search history.

(56) References Cited

U.S. PATENT DOCUMENTS

| | | | | |
|---|---|---|---|---|
| 4,026,088 A | * | 5/1977 | Akabane | E05F 11/385 |
| | | | | 52/716.5 |
| 4,776,132 A | * | 10/1988 | Gold | B60J 1/17 |
| | | | | 49/374 |
| 4,987,699 A | * | 1/1991 | Gold | B60J 1/17 |
| | | | | 156/107 |
| 5,199,217 A | * | 4/1993 | Roze | B60J 1/17 |
| | | | | 49/375 |
| 5,513,468 A | * | 5/1996 | Diestelmeier | E05F 11/385 |
| | | | | 49/351 |
| 5,551,197 A | | 9/1996 | Repp et al. | |
| 9,970,226 B2 | * | 5/2018 | Stewart | E05F 15/689 |

(Continued)

FOREIGN PATENT DOCUMENTS

| | | |
|---|---|---|
| CN | 202294180 | 7/2012 |
| CN | 103303105 | 9/2013 |

(Continued)

*Primary Examiner* — Marcus Menezes
(74) *Attorney, Agent, or Firm* — David Coppiellie; Price Heneveld LLP

(57) ABSTRACT

An operable vehicle window includes a glass panel, a locating adapter coupled to a bottom edge of the glass panel and adhesive disposed with a glass-receiving channel of the locating adapter. The glass-receiving channel includes a first portion that engages inboard and outboard sides of the glass panel and a second portion that engages only an outboard portion of the glass panel.

16 Claims, 8 Drawing Sheets

(56) References Cited

U.S. PATENT DOCUMENTS

| | | | | |
|---|---|---|---|---|
| 10,487,558 B2 * | 11/2019 | Walawender | ......... | E05F 11/385 |
| 2003/0093960 A1 * | 5/2003 | Mizusawa | ............. | E05F 11/385 |
| | | | | 52/204.62 |
| 2017/0284140 A1 * | 10/2017 | Sase | ...................... | E05F 11/385 |
| 2017/0306677 A1 * | 10/2017 | Kosaka | ................. | E05F 11/385 |
| 2018/0202209 A1 * | 7/2018 | Koette | .................. | E05F 11/385 |

FOREIGN PATENT DOCUMENTS

| | | | | | |
|---|---|---|---|---|---|
| DE | 4340363 | | 6/1995 | | |
| DE | 4340363 | A1 * | 6/1995 | ............ | E05F 11/385 |
| JP | 2013019136 | | 1/2013 | | |
| KR | 19980036172 | | 9/1998 | | |
| KR | 100568751 | | 3/2006 | | |
| KR | 20100022664 | | 3/2010 | | |
| KR | 20140028785 | | 3/2014 | | |
| WO | WO-2007102603 | A1 * | 9/2007 | ............ | E05F 11/385 |
| WO | WO-2012015936 | A1 * | 2/2012 | .............. | B60J 1/006 |
| WO | 2015170553 | | 11/2015 | | |
| WO | WO-2015170553 | A1 * | 11/2015 | ............... | B60J 1/17 |
| WO | 2016117451 | | 7/2016 | | |
| WO | 2017097495 | | 6/2017 | | |
| WO | WO-2019115080 | A1 * | 6/2019 | ............ | E05F 11/385 |

\* cited by examiner

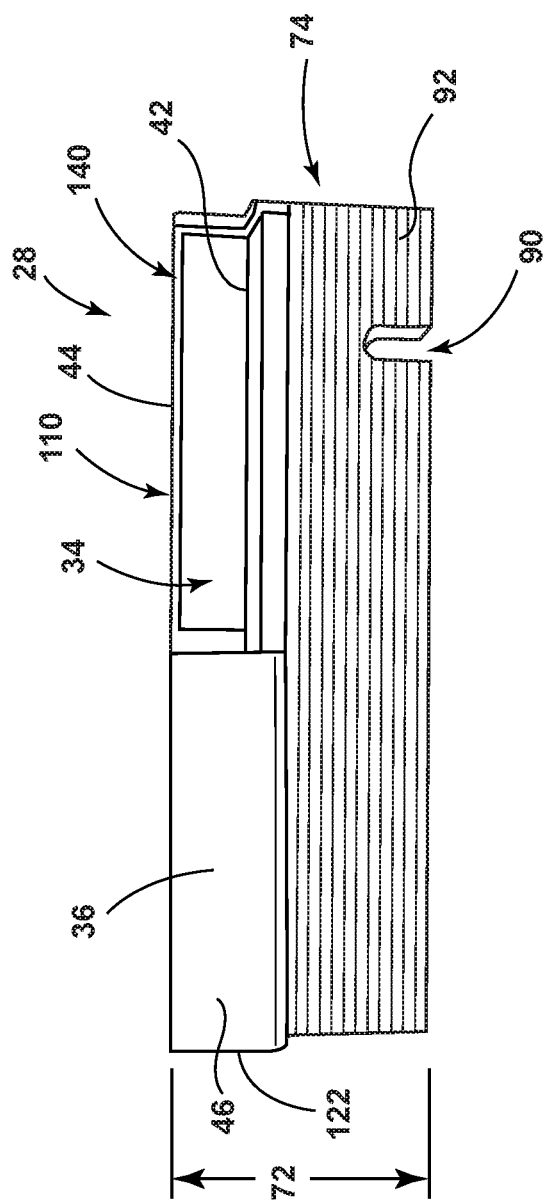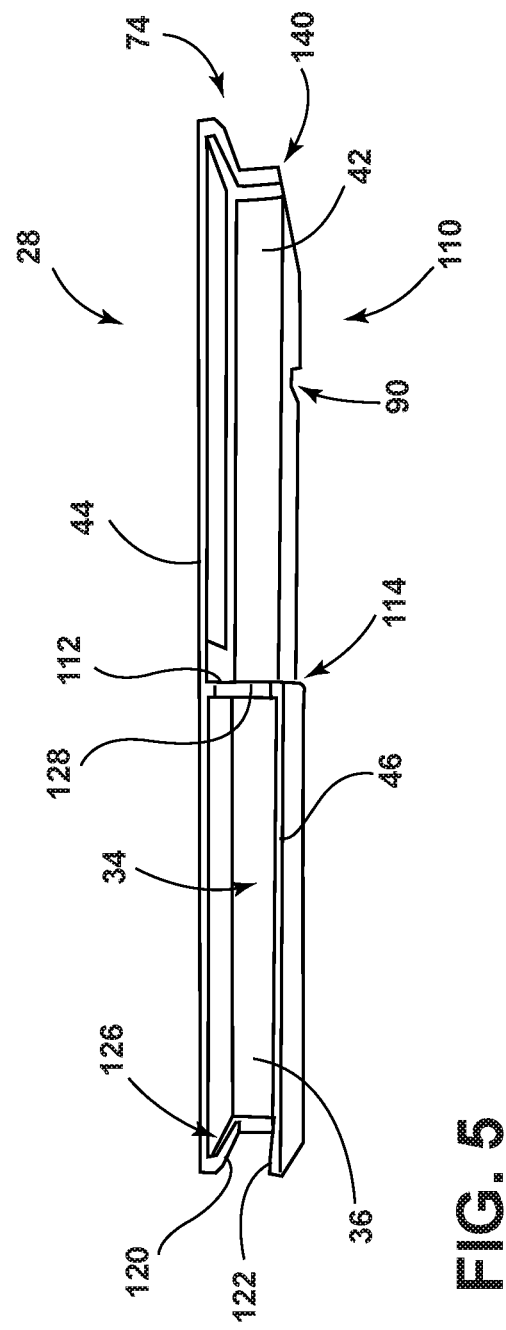
FIG. 4
FIG. 5

US 10,883,299 B2

BONDING BRACKET FOR AN OPERABLE VEHICLE WINDOW HAVING A PARTIALLY OPEN ADHESIVE CHANNEL

CROSS-REFERENCE TO RELATED APPLICATION

The present application is a divisional of U.S. patent application Ser. No. 15/459,026 filed Mar. 15, 2017, entitled BONDING BRACKET FOR AN OPERABLE VEHICLE WINDOW HAVING A PARTIALLY OPEN ADHESIVE CHANNEL, the entire disclosure of which is hereby incorporated herein by reference.

FIELD OF THE INVENTION

The present invention generally relates to vehicle windows, and more specifically, a bonding bracket used to attach a glass panel to a window operating assembly for a vehicle door.

BACKGROUND OF THE INVENTION

Within vehicle doors, typically a glass panel is vertically operable to be open and closed as desired by the user. The glass panel for these operable windows is coupled with an operating mechanism that vertically translates the glass panel within the vehicle door. The glass panel for the vehicle door is typically adhered to a bracket or adapter that attaches between the operating mechanism and the glass panel.

SUMMARY OF THE INVENTION

According to one aspect of the present invention, an operable vehicle window includes a glass panel, a locating adapter coupled to a bottom edge of the glass panel and an adhesive disposed with a glass-receiving channel of the locating adapter. The glass-receiving channel includes a first portion that engages inboard and outboard sides of the glass panel and a second portion that engages only an outboard portion of the glass panel.

Embodiments of this aspect of the invention can include any one or combination of the following features:
- the locating adapter includes a locating notch defined within a base of the locating adapter, wherein the locating notch aligns the locating adapter and the glass panel with a regulator slide of a window operating assembly
- the glass-receiving channel includes opposing first and second walls
- the first wall extends through the first and second portions of the glass-receiving channel and engages the outboard side of the glass panel
- the second wall is disposed only within the first portion and engages the inboard side of the glass panel
- the second portion of the glass-receiving channel defines an adhesive verification mechanism, wherein a portion of the adhesive between the outboard side of the glass panel and the first wall is visible through the glass panel
- a first taper guide disposed proximate a transition between the first and second portions of the glass-receiving channel, wherein a squeeze-out section of the adhesive projects from the first portion and into the second portion via the first taper guide
- a second taper guide disposed proximate an end of the locating adapter proximate the first portion of the glass-receiving channel, the squeeze-out section of the adhesive further projects from the first portion to an area outside of the glass-receiving channel
- the adhesive includes at least one of a two-part urethane adhesive and a silicone adhesive
- the glass panel is an operable window for a front door of a vehicle According to another aspect of the present invention, a method for assembling an operable window within a door of a vehicle includes disposing an adhesive within a glass-receiving channel of a locating adapter, disposing a bottom edge of a glass panel within the glass-receiving channel, pressing the bottom edge of the glass panel into the adhesive to project a squeeze-out section of the adhesive from the glass-receiving channel and curing the adhesive, wherein the adhesive within the glass-receiving channel is at least partially visible through a portion of the glass panel.

Embodiments of this aspect of the invention can include any one or combination of the following features:
- the step of pressing the bottom edge of the glass panel into the adhesive includes visually inspecting the squeeze-out section of the adhesive
- the glass-receiving channel includes first and second portions, wherein the adhesive is visible through the glass panel within the second portion of the glass-receiving channel
- disposing the locating adapter within a window operating assembly; and aligning a locating notch of the locating adapter with a regulator slide of the window operating assembly
- the glass-receiving channel includes opposing first and second walls, wherein the first wall extends through the first and second portions of the glass-receiving channel and engages an outboard side of the glass panel
- the second wall is disposed only within the first portion and engages an inboard side of the glass panel
- the squeeze-out section of an adhesive is projected through first and second taper guides, wherein the first taper guide is disposed proximate a transition between the first and second portions of the glass-receiving channel
- the squeeze-out section of the adhesive projects from the first portion and into the second portion via the first taper guide
- the second taper guide is disposed proximate an end of the locating adapter proximate the first portion of the glass-receiving channel
- the squeeze-out section of the adhesive projects from the first portion to an area outside of the glass-receiving channel According to another aspect of the present invention, a vehicle includes a door, an operable glass panel disposed within the door, a locating adapter attached to a bottom edge of the glass panel and coupled with a window operating assembly, an adhesive coupling the glass panel to the locating adapter, the adhesive including a squeeze-out section that projects at least partially out of a glass-receiving channel of the locating adapter and a locating notch defined within a base of the locating adapter that aligns the glass panel and the locating adapter with the window operating assembly.

Embodiments of this aspect of the invention can include any one or combination of the following features:
- the squeeze-out section of the adhesive is projected through first and second taper guides
- the first taper guide is disposed proximate a transition between first and second portions of the glass-receiving channel the squeeze-out section of the adhesive projects from the first portion and into the second portion via the first taper guide, and wherein the second taper guide is disposed proximate an end of the locating adapter proximate the first portion of the glass-receiving channel the squeeze-out section of the adhesive projects from the first portion to an area outside of the glass-receiving channel the adhesive is visible within the second portion through a portion of the glass panel the glass-receiving channel includes a first wall that engages an outboard side of the glass panel, the first wall extending through first and second portions of the glass-receiving channel the glass-receiving channel includes an opposing second wall that engages an inboard side of the glass panel, wherein the opposing second wall extends only within the first portion of the glass-receiving channel the opposing second wall defines an open section within which the glass panel can deflect in an inward direction when the door is moved into a closed position These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a front perspective view of an aspect of a locating adapter used to couple the glass panel to the window operating assembly;

FIG. 5 is a top perspective view of the locating adapter of FIG. 4;

DETAILED DESCRIPTION OF THE PREFERRED EMBODIMENTS

Figure 1:
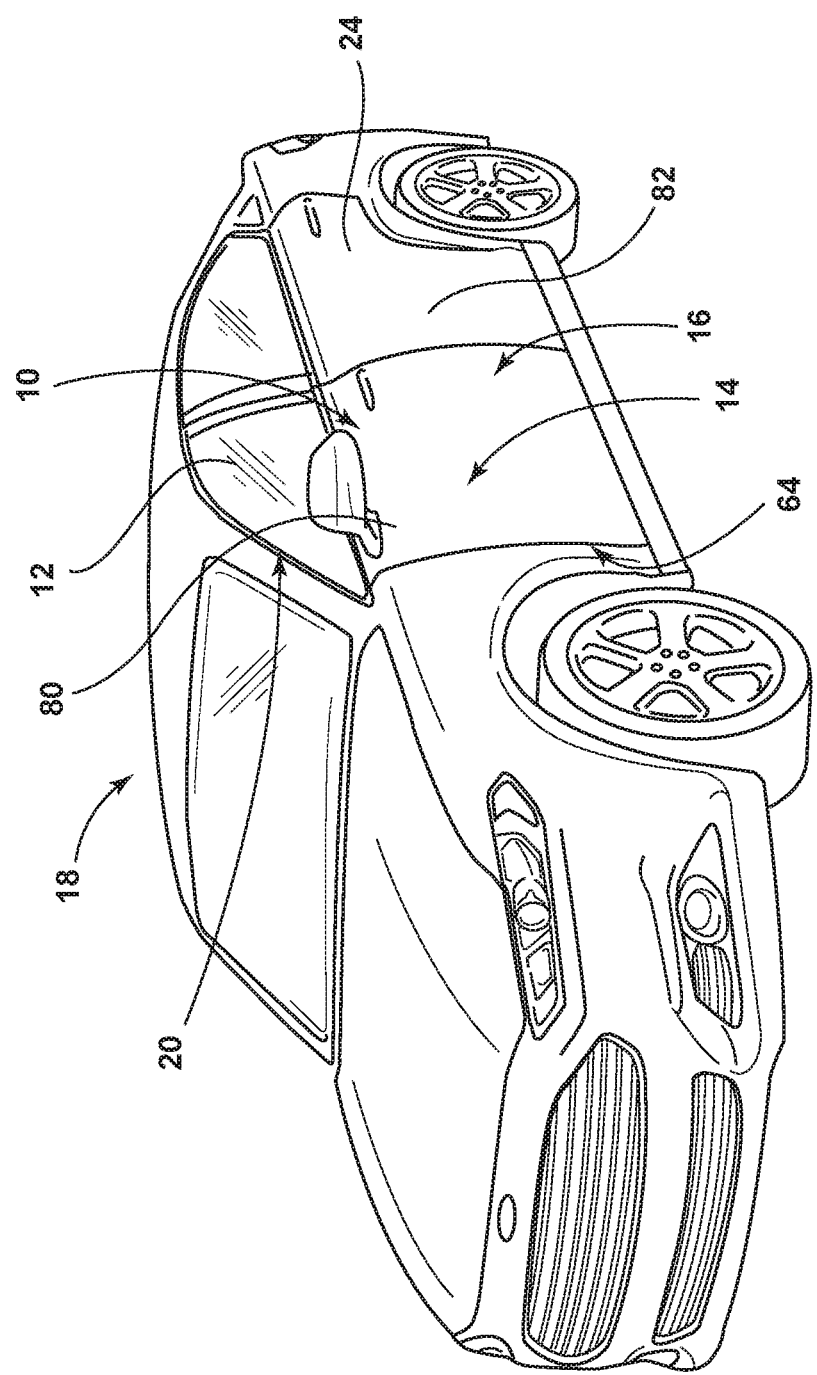
FIG. 1 is a front perspective view of a vehicle incorporating an aspect of the operable window within the vehicle doors.
Figure 2:
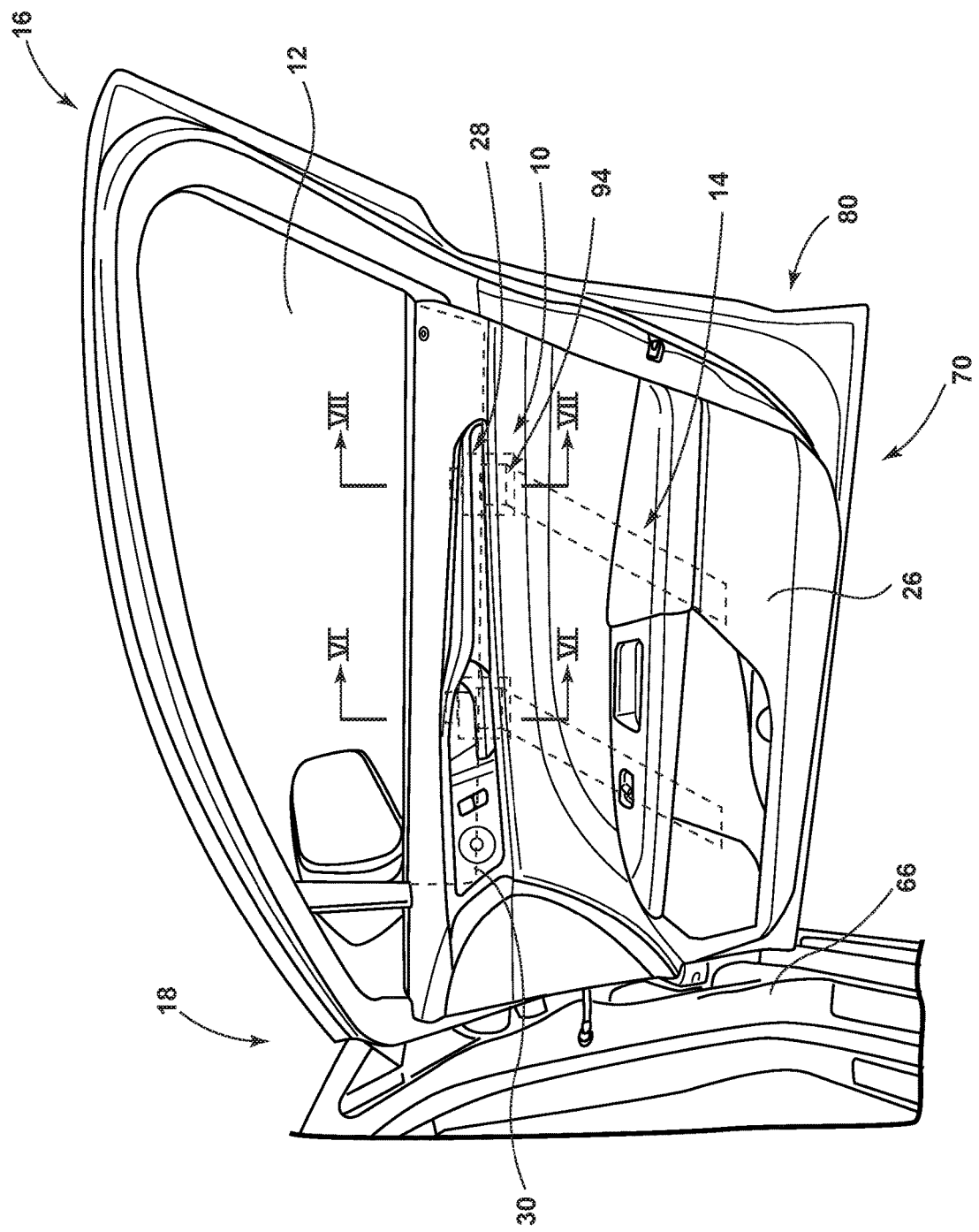
FIG. 2 is a side perspective view of a vehicle door of the vehicle of FIG. 1 and showing the door in an open position.
Figure 3:
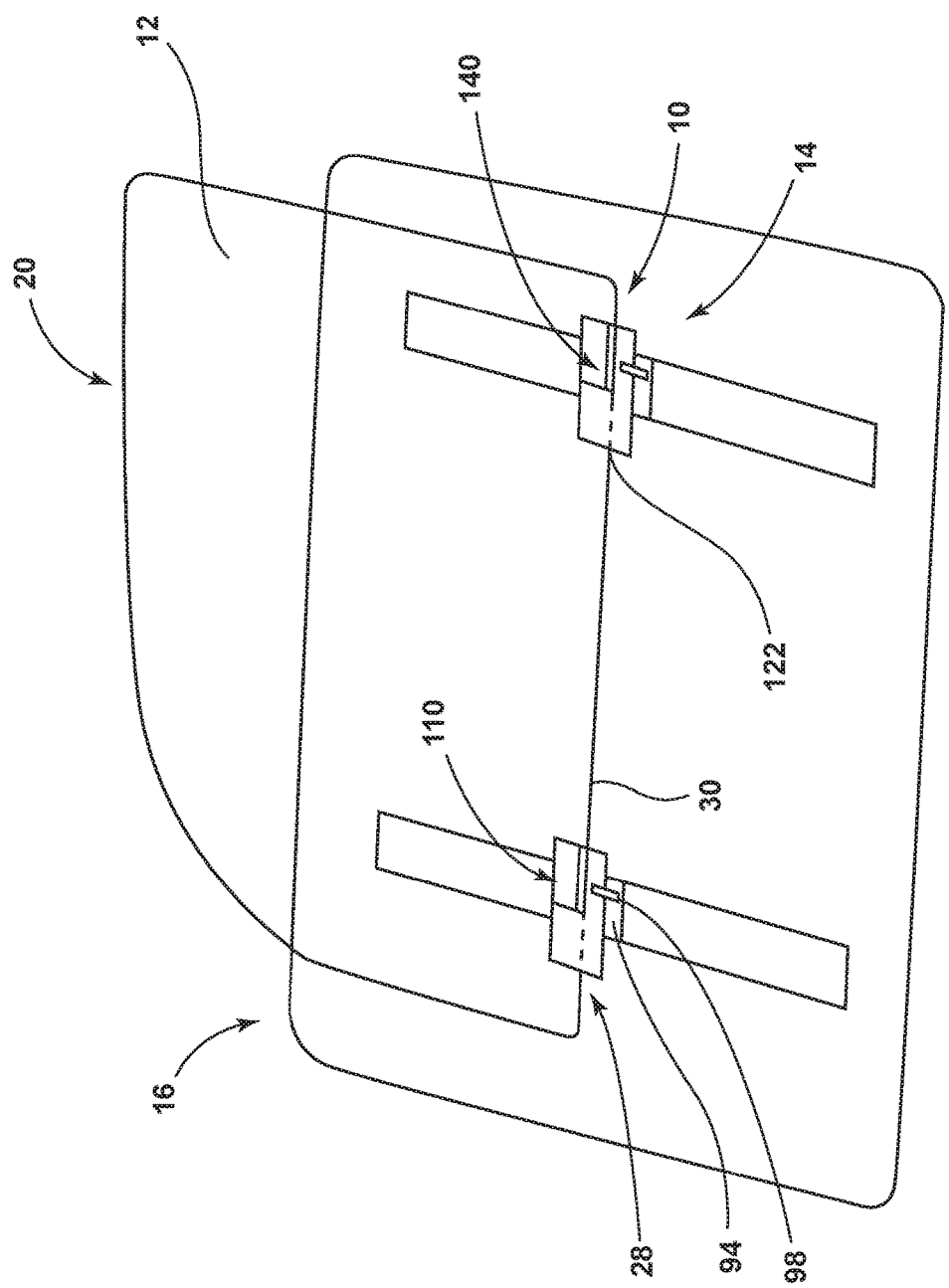
FIG. 3 is a schematic elevational view of an aspect of an attachment mechanism for securing a glass panel to the window operating assembly.
Figure 6:
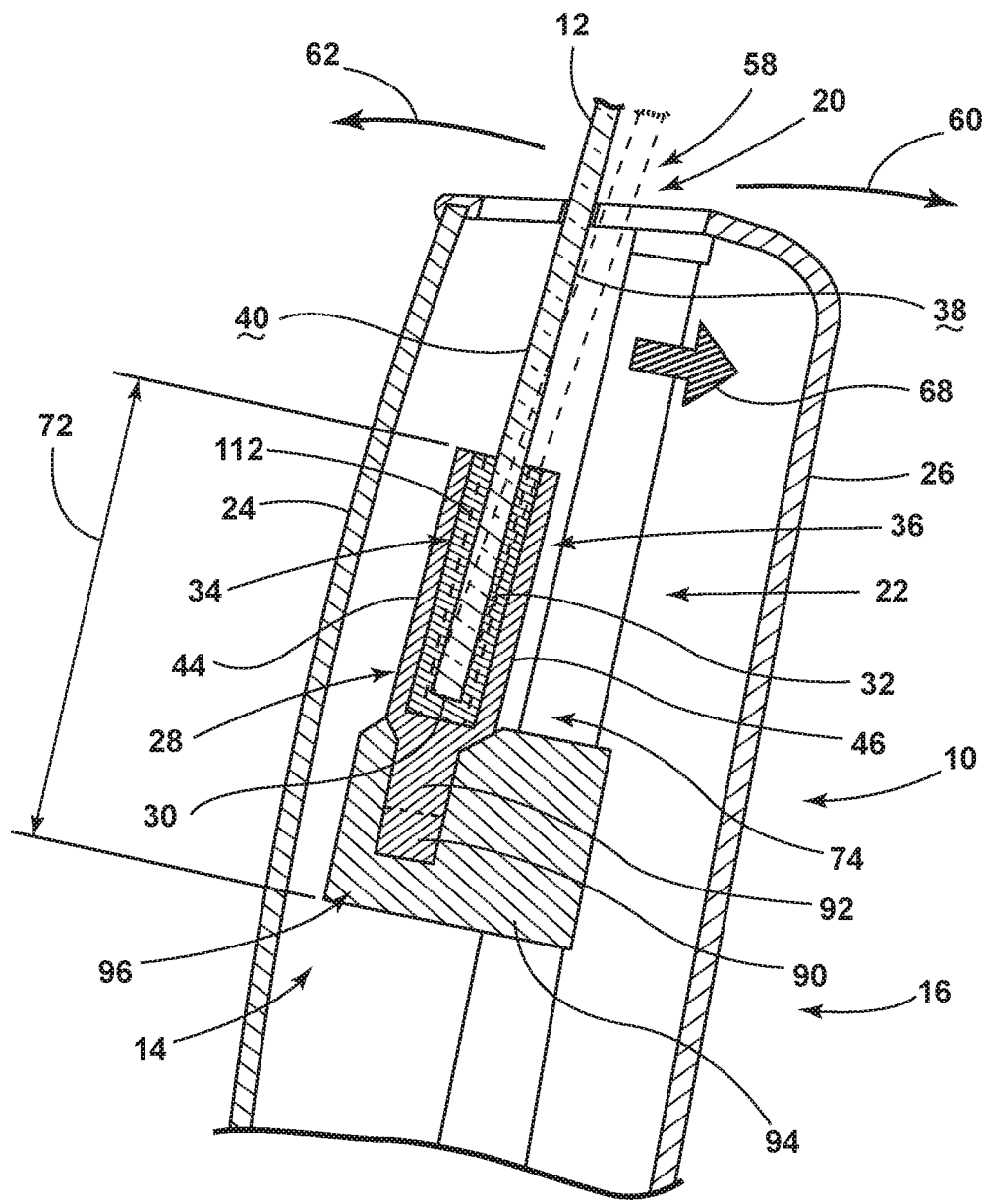
FIG. 6 is a cross-sectional view of the vehicle door of FIG. 2, taken through line VI-VI and taken through a first portion of the locating adapter.
Figure 7:
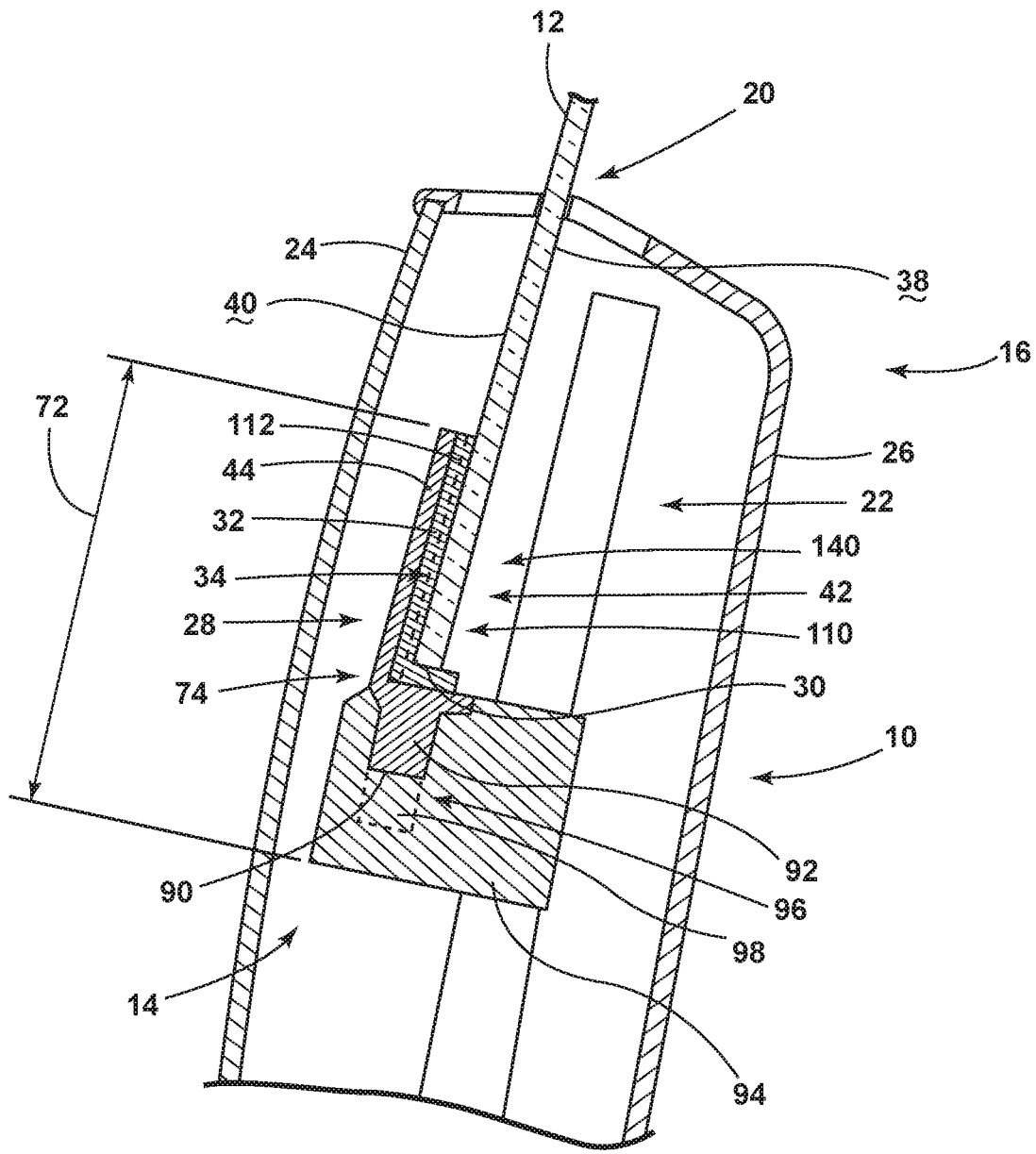
FIG. 7 is a cross-sectional view of the vehicle door of FIG. 2, taken along line VII-VII, and taken through a second portion of the locating adapter.
Figure 8:
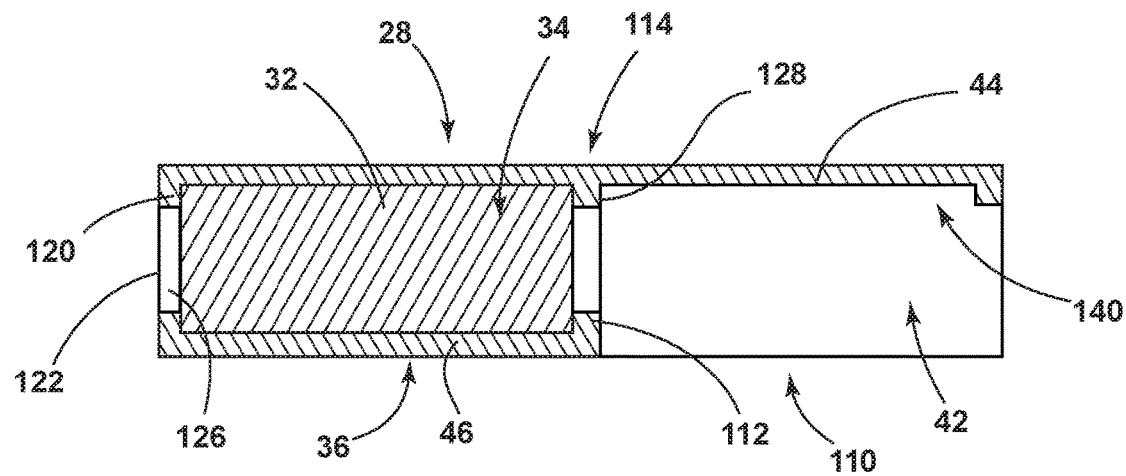
FIG. 8 is a cross-sectional view of a locating adapter with adhesive disposed therein before the window panel is disposed within the glass-receiving channel for the locating adapter.
Figure 9:
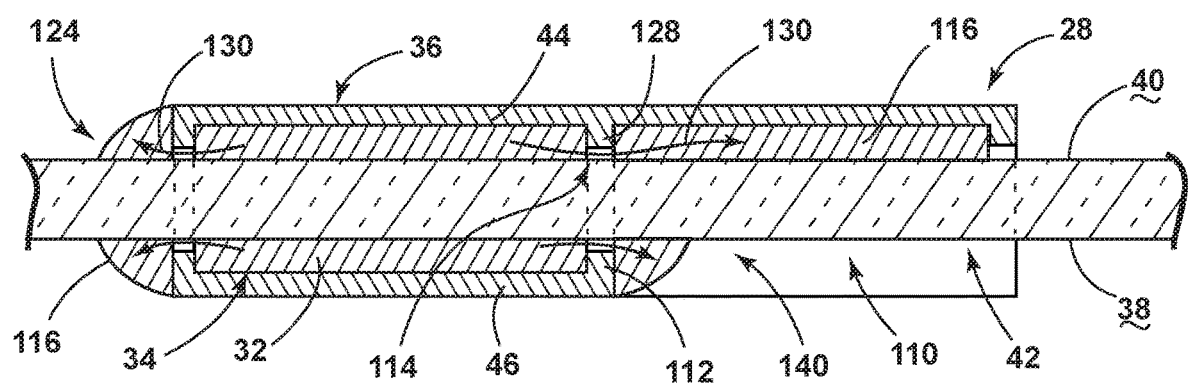
FIG. 9 is a cross-sectional view of the locating adapter of FIG. 8 showing installation of the glass panel that forms squeeze-out sections of the adhesive within and around the glass-receiving channel of the locating adapter.
Figure 10:
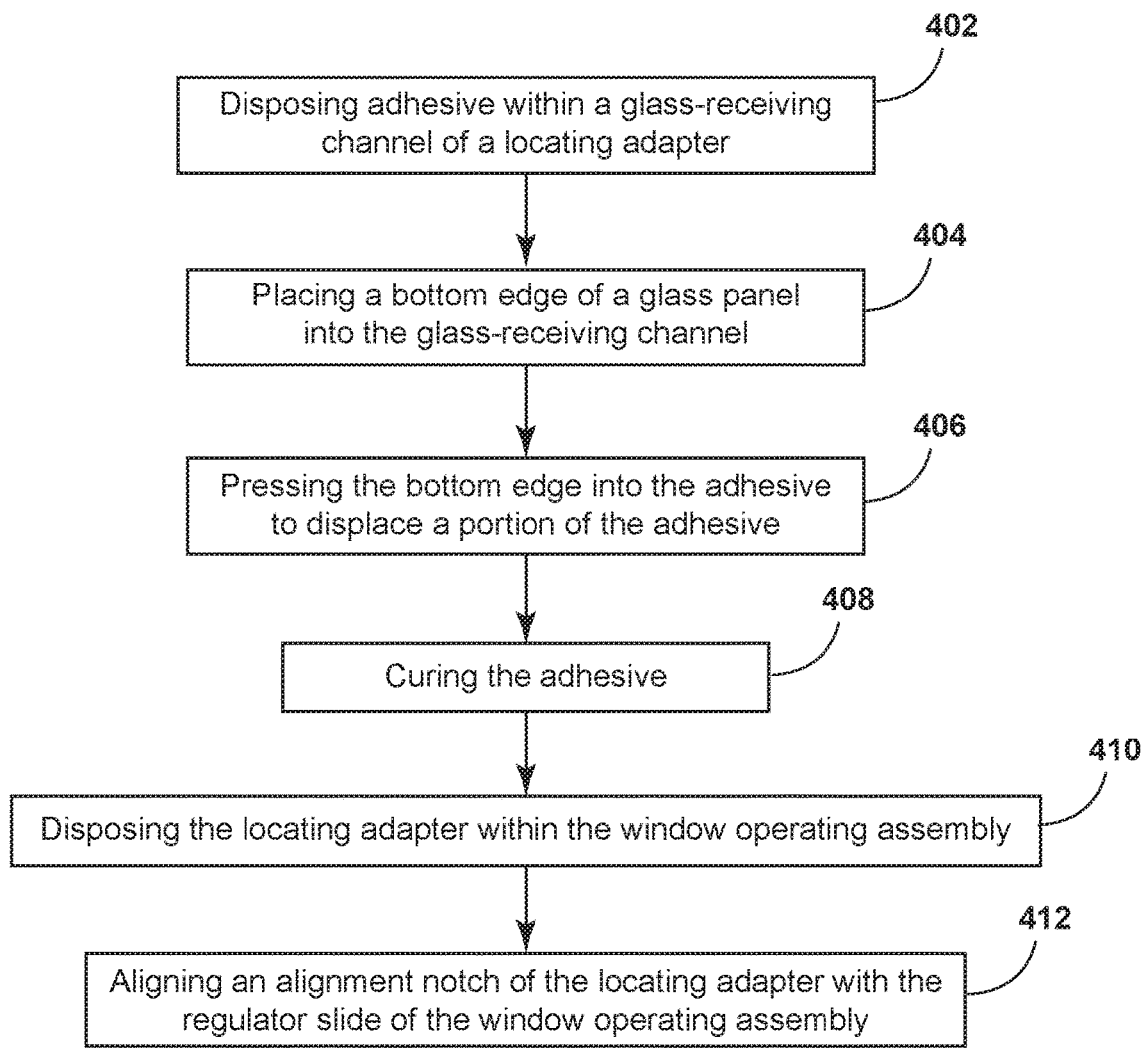
FIG. 10 is a schematic flow diagram illustrating a method for assembly of an operable window within a door of a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to an attachment assembly that secures a glass panel 12 to a window operating assembly 14 within a door 16 of a vehicle 18. The attachment assembly 10 defines a portion of the operable window 20 for the vehicle 18 that can be translated vertically within a cavity 22 of the door 16 defined between an outer panel 24 and an inner trim panel 26 for the door 16 of the vehicle 18. The operable window 20 for the door 16 can include a glass panel 12 and a locating adapter 28 that is coupled to a bottom edge 30 of the glass panel 12. Adhesive 32 is disposed within a glass-receiving channel 34 of the locating adapter 28. The glass-receiving channel 34 includes a first portion 36 that engages inboard and outboard sides 38, 40 of the glass panel 12 proximate the bottom edge 30 of the glass panel 12. A second portion 42 of the glass-receiving channel 34 engages only the outboard side 40 of the glass panel 12. The glass-receiving channel 34 includes opposing first and second walls 44, 46. The first wall 44 extends through the first and second portions 36, 42 of the glass-receiving channel 34 and engages the outboard side 40 of the glass panel 12. The second wall 46 is disposed opposite the first wall 44 and is only disposed, typically, within the first portion 36 of the glass-receiving channel 34. The second wall 46 typically engages the inboard side 38 of the glass panel 12.

Referring again to FIGS. 1-7, because the second wall 46 is not located within the second portion 42 of the glass-receiving channel 34, the adhesive 32 disposed within the glass-receiving channel 34 can be viewed through the glass panel 12 within the second portion 42 of the glass-receiving channel 34. In this manner, during assembly of the operable window 20 when the glass panel 12 is attached to the one or more locating adapters 28, an individual can visibly inspect and verify that the adhesive 32 is properly disposed between the locating adapter 28 and the glass panel 12. This adhesive 32 is typically disposed between the first wall 44 and the outboard side 40 of the glass panel 12 within the second portion 42. Because the second portion 42 does not include the second wall 46, the individual assembling the operable window 20 is able to see through the glass panel 12 to verify that the adhesive 32 is properly disposed in this location.

It is contemplated that this configuration that includes a full-length first wall 44 and a partial-length second wall 46 can provide for easy installation of the glass panel 12 within the glass-receiving channel 34 of the locating adapter 28. Additionally, the absence of the second wall 46 within the second portion 42 of the locating adapter 28 allows for an at least partial deflection 58 of the glass panel 12 in an inward direction 60 and an outward direction 62 during operation of the door 16 and the vehicle 18. By way of example, and not limitation, when the vehicle door 16 is moved to a closed position 64, the impact of the door 16 with a frame 66 of a vehicle 18 can cause vibration, deflection 58, or other movement of the glass panel 12 with respect to the locating adapter 28 and the rest of the window operating assembly 14. The shorter configuration of the second wall 46 typically allows for a deflection 58 to occur where the glass panel 12 is allowed to deflect in an inward or outward direction 60, 62 to absorb at least a portion of the impact force 68 as the door 16 is moved to the closed position 64 from the open position 70. Additionally, the first and second walls 44, 46 can have a minimal height 72 that defines a low-profile bracket 74 that engages the glass panel 12 only a minimal distance above the bottom edge 30 of the glass panel 12. This configuration further allows deflection 58 of the glass panel 12 with respect to the locating adapter 28 that can assist in absorbing the various forces 68 experienced by the glass panel 12 during a closure of the door 16 of the vehicle 18. Typically, these forces 68 are at their highest during a high impact closure or slam of the door 16 of the vehicle 18.

Referring again to FIGS. 1-7, the low-profile configuration of the locating adapter 28 and the first and second walls 44, 46 allow for a greater vertical translation of the glass panel 12 within the vehicle door 16 since the locating adapters 28 occupy less space in a vertical direction. The height 72 of the low-profile configuration also provides for greater versatility of utilizing space within the cavity 22 of the vehicle door 16 and allows for a full drop of the glass panel 12 into the cavity 22 of the front door 80 of the vehicle 18 as well as the rear door 82 of the vehicle 18. The space saved due to the use of the low-profile locating adapter 28 allows for greater space within the cavity 22 of each door 16 of the vehicle 18 for added structural and/or mechanical features that may be disposed within the cavity 22 of the door 16.

Referring again to FIGS. 1-7, the locating adapter 28 can include a locating notch 90 that is defined within a base 92 of the locating adapter 28. The use of the locating notch 90 serves to align the locating adapter 28 and the glass panel 12 with a regulator slide 94 disposed within a window operating assembly 14. During assembly of the operable window 20, the locating adapter 28 or multiple locating adapters 28 are disposed along the bottom edge 30 of the glass panel 12. The glass panel 12 with the locating adapter 28 attached thereto is then inserted into the regulator slide 94 of the window operating assembly 14. The locating notch 90 defined within the base 92 of the locating adapter 28 allows for convenient feedback 96 to the individual that is assembling the operable window 20. Once the base 92 of the locating adapter 28 is properly engaged within the regulator slide 94, the locating adapter 28 can be secured thereto for final assembly. The locating notch 90 can be in the form of a cutout, groove, slot, or other geometric shape defined within the base 92 of the locating adapter 28. Where the locating notch 90 is a single cutout feature, within the base 92 of the locating adapter 28, the feedback 96 provided to the individual assembling the operable window 20 can be free of a false feedback 96 or an improper installation as the only cutout within the base 92 of the locating adapter 28 is the locating notch 90. Typically, the remainder of the base 92 of the locating adapter 28 is a continuous surface. In this manner, the installer is provided with feedback 96 as to the correct installation when the locating adapter 28 fits into a mating engagement feature 98 defined within the regulator slide 94 of the window operating assembly 14. Typically, the feedback 96 is in the form of translation of the glass panel 12 and locating adapter 28 in a direction perpendicular to an axis of the wind-receiving channel in conjunction with no or little movement along the axis. The feedback 96 can also include various sounds or visual feedback 96 that informs the assembly worker that the locating notch 90 is mated with the mating engagement feature 98 of the regulator slide 94.

Referring now to FIGS. 3-9, the second portion 42 of the glass-receiving channel 34 can define an adhesive verification system 110. In such an embodiment, a portion of the adhesive 32 that is defined between the outboard side 40 of the glass panel 12 and the first wall 44 is visible through the glass panel 12 within the second portion 42 of the glass-receiving channel 34. To assist in locating adhesive 32 within the second portion 42, the locating adapter 28 can include a first taper guide 112 that is disposed proximate a transition 114 between the first and second portions 36, 42 of the glass-receiving channel 34. When the glass panel 12 is disposed within the glass-receiving channel 34, the adhesive 32 is at least partially displaced by the glass panel 12 such that a squeeze-out section 116 of the adhesive 32 projects from the first portion 36 of the glass-receiving channel 34 and into the second portion 42 of the glass-receiving channel 34 via the first taper guide 112. According to various embodiments, the first taper guide 112 can be adapted such that the squeeze-out section 116 of adhesive 32 primarily extends into the second portion 42 and within the space between the outboard side 40 of the glass panel 12 and the first wall 44.

Referring again to FIGS. 3-9, the glass-receiving channel 34 can also include a second taper guide 120 that is disposed proximate an end 122 of the locating adapter 28 proximate the first portion 36 of the glass-receiving channel 34. Similar to the first taper guide 112, the second taper guide 120 allows for displacement 130 of the adhesive 32 to occur, resulting in an additional portion of the squeeze-out section 116 of the adhesive 32. The squeeze-out section 116 of the adhesive 32 can extend through the second taper guide 120 and project from the first portion 36 to an adhesive area 124 outside of the glass-receiving channel 34. The first and second taper guides 112, 120 can be in the form of narrowed portions 126 of the glass-receiving channel 34. The narrowed portions 126 can be defined by ribs 128 that serve to direct the displacement 130 of the adhesive 32 to be upward and around the glass panel 12 and also outward to the second portion 42 of the glass-receiving channel 34 and/or the adhesive area 124 of the end 122 of the locating adapter 28.

In certain embodiments, the ribs 128 of the first and second taper guides 112, 120 can assist in positioning the glass panel 12 within the glass-receiving channel 34. In this manner, the ribs 128 can at least partially engage the inboard and outboard sides 38, 40 of the glass panel 12 This engagement between the ribs 128 and the glass panel 12 sets the locating adapter 28 at substantially the proper angle with respect to the glass panel 12. The ribs 128 also assist in directing the displacement 130 of the adhesive 32. The ribs 128 cooperate with the inboard and outboard sides 38, 40 of the glass panel 12 to at least partially contain the adhesive 32 therein. As the glass panel 12 is placed in the adhesive 32, this partial containment of the adhesive 32 causes an upward displacement 130 of the adhesive 32 around the inboard and outboard sides 38, 40 of the glass panel 12. Displacement 130 is also allowed toward the second portion 42 of the glass-receiving channel 34 and also toward the adhesive area 124. This configuration allows for adequate coverage of the adhesive 32 such that a robust connection is possible while using the low-profile bracket 74 in the form of the locating adapter 28 disclosed herein.

The squeeze-out section 116 of the adhesive 32 that extends out from the first portion 36 can be visually inspected by the individual assembling the operable window 20. Through this visual inspection, it can be verified that the adhesive 32 is properly disposed between the glass panel 12 and the locating adapter 28. Through this adhesive verification system 110, a substantially robust connection between the glass panel 12 and the locating adapter 28 can be at least preliminarily verified. In this manner, the quality of the assembly can be substantially verified early in the assembly process. Additionally, a consistent amount of adhesive 32 can be disposed within the first portion 36 of the glass-receiving channel 34 for each manufactured door 16. This consistent amount of adhesive 32 can be designed to result in a certain amount of a squeeze-out section 116 of the adhesive 32 to project from the first portion 36 of the glass-receiving channel 34. As discussed above, this squeeze-out section 116 of the adhesive 32 can serve as a visual confirmation that the connection between the glass panel 12 and the locating adapter 28 appears to be adequate to continue assembly of the operable window 20. It is contemplated that additional testing may be undertaken to verify the strength of the connection.

According to the various embodiments, the adhesive 32 used in attaching the glass panel 12 to the locating adapter 28 can be in the form of various adhesives 32 that can include, but are not limited to, a two-part urethane adhesive, silicone adhesive, epoxies, combinations thereof, and other similar adhesives 32. It is also contemplated that the locating adapter 28 can be made of various materials. These materials can include, but are not limited to, plastic, other polymer-type materials, metal, metal alloys, composite materials, combinations thereof, and other similar materials that can provide a sufficient structure for the attachment between the glass panel 12 and the window operating assembly 14.

Referring now to FIGS. 1-10, having described various aspects of the operable window 20, a method 400 is disclosed for assembling an operable window 20 to be disposed within a door 16 of a vehicle 18. According to the method 400, an adhesive 32 is disposed within a glass-receiving channel 34 of a locating adapter 28 (step 402). Typically, the adhesive 32 will be disposed within only the first portion 36 of the glass-receiving channel 34. It is also contemplated that the adhesive 32 can be disposed throughout the entire glass-receiving channel 34 within both of the first and second portions 36, 42 thereof. Once the adhesive 32 is located, a bottom edge 30 of the glass panel 12 is disposed within a glass-receiving channel 34 (step 404). Typically, two locating adapters 28 will be disposed along the bottom edge 30 of the glass panel 12. It is contemplated that a single locating adapter 28 can be disposed at the bottom edge 30. The number of locating adapters 28 can typically match the number of regulator slides 94 that are disposed within the window operating assembly 14. The bottom edge 30 of the glass panel 12 is then pressed into the adhesive 32. This pressing of the bottom edge 30 of the glass panel 12 into the adhesive 32 serves to displace at least a portion of the adhesive 32 to project a squeeze-out section 116 of the adhesive 32 from the glass-receiving channel 34 (step 406). This squeeze-out section 116 can include portions of the adhesive 32 that extend through at least one of the first and second taper guides 112, 120. Accordingly, the squeeze-out section 116 of adhesive 32 can extend outside of the locating adapter 28 or can extend from the first portion 36 of the glass-receiving channel 34 and into the second portion 42 of the glass-receiving channel 34. The presence of the squeeze-out section 116 of adhesive 32 is used as an inspection mechanism to verify, at least visually, the presence of the adhesive 32 throughout a substantial portion of the glass-receiving channel 34 and around the glass panel 12. Once the squeeze-out section 116 of adhesive 32 is defined, the adhesive 32 is then cured (step 408). The adhesive 32 within the glass-receiving channel 34 can be at least partially visible through a portion of the glass panel 12. Typically, the second portion 42 of the glass panel 12 will have an open section 140 that allows for the visual inspection of the adhesive 32 through a portion of the inboard side glass panel 12. The locating adapter 28 can then be disposed within a window operating assembly 14 (step 410). The locating notch 90 of the locating adapter 28 is then aligned with a mating engagement feature 98 of the regulator slide 94 of the window operating assembly 14 (step 412). The engagement of the locating notch 90 with the mating engagement feature 98 serves to properly locate and align the locating adapter 28 in the glass panel 12 within the window operating assembly 14 to ensure or substantially ensure proper installation.

Referring again to FIGS. 1-9, the window operating assembly 14 is typically installed within a door 16 of a vehicle 18. An operable glass panel 12 is disposed within the door 16 and a locating adapter 28 attached to a bottom edge 30 of the glass panel 12 is coupled with a window operating assembly 14. An adhesive 32 couples the glass panel 12 to the locating adapter 28. According to the various embodiments, the adhesive 32 includes a squeeze-out section 116 that projects at least partially out of the glass-receiving channel 34 of the locating adapter 28. The locating notch 90 defined within the base 92 of the locating adapter 28 serves to align the glass panel 12 and the locating adapter 28 within the window operating assembly 14. This alignment also properly aligns the glass panel 12 within the cavity 22 of the door 16 to ensure proper operation of the glass panel 12 during use of the vehicle 18.

According to the various embodiments, the locating adapter 28 can be used in various settings of the vehicle 18. These settings can include, but are not limited to, front doors 80, rear doors 82, operable windows 20 within cargo doors, and other similar settings.

The low-profile brackets 74 used within the locating adapter 28 are found to have a height 72 that is approximately 50% smaller in a vertical direction from other similar conventional window brackets. These low-profile locating adapters 28 provide added flexibility for styling and also allows for extra space to include various structural and safety features that may be more equipped to receive various impact forces 68 during a crash condition. The low-profile locating adapters 28 also are smaller in size and require less adhesive 32 to fill the glass-receiving channel 34. The adhesive verification system 110 helps to ensure proper coverage of the adhesive 32 between the glass panel 12 and the low-profile locating adapter 28, while using less adhesive 32 than conventional brackets. The use of the locating notch 90 also allows the installation of the glass panel 12 with the locating adapters 28 to be a one-person installation process. The feedback 96 provided between the locating notch 90 and the mating engagement feature 98 of the regulator slide 94 provides sufficient information to the individual such that two people may not be necessary to install the glass panel 12. Accordingly, labor is needed for installing the glass panel 12, having the locating adapter 28.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for assembling an operable window within a door of a vehicle, the method including steps of:
    disposing an adhesive within a glass-receiving channel of a locating adapter;

disposing a bottom edge of a glass panel within the glass-receiving channel;

pressing the bottom edge of the glass panel into the adhesive to project a squeeze-out section of the adhesive from the glass-receiving channel; and curing the adhesive, wherein the adhesive within the glass-receiving channel is at least partially visible through a portion of the glass panel; wherein, the glass-receiving channel includes first and second portions and the adhesive is visible through the glass panel within the second portion of the glass-receiving channel;

the glass-receiving channel includes opposing first and second walls;

the first wall extends through the first and second portions of the glass-receiving channel and engages an outboard side of the glass panel; and the second wall is disposed only within the first portion and engages an inboard side of the glass panel.

2. The method of claim 1, wherein the step of pressing the bottom edge of the glass panel into the adhesive includes visually inspecting the squeeze-out section of the adhesive.

3. The method of claim 1, further comprising steps of:
disposing the locating adapter within a window operating assembly; and
aligning a locating notch of the locating adapter with a regulator slide of the window operating assembly.

4. The method of claim 1, wherein the squeeze-out section of the adhesive is projected through first and second taper guides.

5. The method of claim 4, wherein the first taper guide is disposed proximate a transition between the first and second portions of the glass-receiving channel, the squeeze-out section of the adhesive projecting from the first portion and into the second portion via the first taper guide.

6. The method of claim 4, wherein the second taper guide is disposed proximate an end of the locating adapter proximate the first portion of the glass-receiving channel, the squeeze-out section of the adhesive projecting from the first portion to an area outside of the glass-receiving channel.

7. A method for assembling an operable window within a door of a vehicle, the method including steps of:
disposing an adhesive within a glass-receiving channel of a locating adapter, the glass-receiving channel having a first U-shaped section at one end of the glass-receiving channel and a second L-shaped section positioned at an opposing end of the glass-receiving channel;
disposing a bottom edge of a glass panel within the glass-receiving channel; and
pressing the bottom edge of the glass panel into the adhesive to project a squeeze-out section of the adhesive from the glass-receiving channel, wherein the squeeze-out section of the adhesive is visible at least through a portion of the glass panel and only within the second L-shaped section.

8. The method of claim 7, wherein the step of pressing the bottom edge of the glass panel into the adhesive includes visually inspecting the squeeze-out section of the adhesive by viewing the adhesive through the portion of the glass panel.

9. The method of claim 7, further comprising steps of:
curing the adhesive;
disposing the locating adapter within a window operating assembly; and
aligning a locating notch of the locating adapter with a regulator slide of the window operating assembly.

10. A method for assembling an operable window within a door of a vehicle, the method including steps of:
disposing an adhesive within a glass-receiving channel of a locating adapter, the glass-receiving channel having a first U-shaped section taken vertically through the glass-receiving channel; and a second L-shaped section taken vertically through the glass-receiving channel;
disposing a bottom edge of a glass panel within the glass-receiving channel, wherein the first U-shaped section of the glass-receiving channel engages inboard and outboard sides of the glass panel and the second L-shaped section of the glass-receiving channel engages only the outboard side of the glass panel;
pressing the bottom edge of the glass panel into the adhesive to project a squeeze-out section of the adhesive from the glass-receiving channel; and
curing the adhesive, wherein the adhesive within the glass-receiving channel is at least partially visible through a portion of the glass panel.

11. The method of claim 10, wherein the first U-shaped section extends only a partial length from one of two longitudinal edges of the locating adapter, wherein the pressing step projects the squeeze-out section at both ends of the first U-shaped section.

12. The method of claim 11, wherein the step of pressing the bottom edge of the glass panel into the adhesive includes visually inspecting the squeeze-out section of the adhesive at the ends of the first U-shaped section.

13. The method of claim 10, further comprising steps of:
disposing the locating adapter within a window operating assembly; and
aligning a locating notch of the locating adapter with a regulator slide of the window operating assembly.

14. The method of claim 10, wherein the glass-receiving channel includes opposing first and second walls, wherein the first wall extends through the first U-shaped section and the second L-shaped section of the glass-receiving channel and engages the outboard side of the glass panel.

15. The method of claim 14, wherein the second wall is disposed only within the first U-shaped section and engages the inboard side of the glass panel.

16. The method of claim 10, wherein the squeeze-out section of the adhesive is projected through first and second taper guides.

* * * * *